US010041736B2

(12) United States Patent
Kumar et al.

(10) Patent No.: US 10,041,736 B2
(45) Date of Patent: Aug. 7, 2018

(54) DYNAMIC MONITORING, DIAGNOSIS, AND CONTROL OF COOLING TOWER SYSTEMS

(71) Applicant: BL Technologies, Inc., Minnetonka, MN (US)

(72) Inventors: Aditya Kumar, Guilderland, NY (US); Brett R. Ellis, Farmington Hills, MI (US); Zhaoyang Wan, Trevose, PA (US); Claudia C. Pierce, Trevose, PA (US); Mustafa Tekin Dokucu, Latham, NY (US); Dongrui Wu, Clifton Park, NY (US); Sangeeta Balram, Bangalore (IN)

(73) Assignee: BL Technologies, Inc., Minnetonka, MN (US)

( * ) Notice: Subject to any disclaimer, the term of this patent is extended or adjusted under 35 U.S.C. 154(b) by 101 days.

(21) Appl. No.: 14/907,324

(22) PCT Filed: Jul. 25, 2013

(86) PCT No.: PCT/US2013/051981
§ 371 (c)(1),
(2) Date: Jan. 25, 2016

(87) PCT Pub. No.: WO2015/012832
PCT Pub. Date: Jan. 29, 2015

(65) Prior Publication Data
US 2016/0169585 A1 Jun. 16, 2016

(51) Int. Cl.
F28C 1/04 (2006.01)
G05B 23/02 (2006.01)
(Continued)

(52) U.S. Cl.
CPC .............. F28C 1/04 (2013.01); F28F 27/003 (2013.01); G05B 13/048 (2013.01); G05B 23/0243 (2013.01); F28F 2200/00 (2013.01)

(58) Field of Classification Search
CPC ....... F28C 1/04; F28F 27/003; F28F 2200/00; G05B 13/048; G05B 23/0243
See application file for complete search history.

(56) References Cited

U.S. PATENT DOCUMENTS 4,635,182 A    1/1987  Hintz
7,455,099 B2   9/2008  Osborn et al.
(Continued)

FOREIGN PATENT DOCUMENTS

EP    1103926 A2    5/2001
EP    2500787 A1    9/2012
WO    2011100736 A2    8/2011

OTHER PUBLICATIONS

B. Sun, P. B. Luh, Z. O'Neill and F. Song, "Building energy doctors: SPC and Kalman filter-based fault detection," 2011 IEEE International Conference on Automation Science and Engineering, Trieste, 2011, https://pdfs.semanticscholar.org/eee1/de1d90874bbe8f4ca855da20378c90584ce5.pdf.*
(Continued)

Primary Examiner — Charles Kasenge
(74) Attorney, Agent, or Firm — Meunier Carlin & Curfman LLC

(57) ABSTRACT

A cooling tower simulation system may receive a measurement from a cooling tower sensor and generate a predicted output of a cooling tower system based on a model of the cooling tower system. The simulation system may generate an estimated output using an extended Kalman filter with the measurement and the predicted output as inputs, wherein the estimated output represents a characteristic of the cooling tower system.

17 Claims, 5 Drawing Sheets

(51) Int. Cl.
    *G05B 13/04*     (2006.01)
    *F28F 27/00*     (2006.01)

(56) References Cited

U.S. PATENT DOCUMENTS

| | | | |
|---|---|---|---|
| 7,623,993 | B2 | 9/2009 | Kelkar et al. |
| 9,235,657 | B1* | 1/2016 | Wenzel .................. G06F 17/50 |
| 9,436,179 | B1* | 9/2016 | Turney .................. G05B 23/02 |
| 2008/0071395 | A1 | 3/2008 | Pachner |
| 2012/0131504 | A1 | 5/2012 | Fadell et al. |
| 2012/0185728 | A1 | 7/2012 | Guo et al. |
| 2016/0098022 | A1* | 4/2016 | Wenzel ............. G05B 13/0265 700/275 |
| 2016/0195866 | A1* | 7/2016 | Turney .................. G05B 23/02 700/291 |

OTHER PUBLICATIONS

Navarro-Esbri et al., "A Vapour Compression Chiller Fault Detection Technique Based on Adaptative Algorithms Application to On-line Refrigerant Leakage Detection", International journal of Refrigeration, vol. No. 29, Issue No. 5, pp. 716-723, Feb. 24, 2006.

Li et al., "Dynamic Modeling of Mechanical Draft Counter-Flow Wet Cooling Tower with Modelica", International Refrigeration and Air Conditioning Conference, pp. 1-9, Jul. 10-15, 2010.

Sun et al., "SPC and Kalman Filter-Based Fault Detection and Diagnosis for an Air-Cooled Chiller", Front. Electr. Electron. Eng. China, vol. No. 6, Issue No. 3, pp. 412-423, 2011.

Sun et al., "Building Energy Doctors: SPC and Kalman Filter-Based Fault Detection" Automation Science and Engineering, pp. 333-340, Aug. 24, 2011.

Oldewurtel, "Stochastic Model Predictive Control for Energy Efficient Building Climate Control", ETH Zurich, pp. 1-189, 2011.

Albert, "A Combined Kalman Filter and Error in Constitutive Relation Approach for System Identification in Structural Dynamics", Ecole Polytechnique, pp. 1-202, Aug. 22, 2012.

PCT Search Report and Written Opinion issued in connection with corresponding Application No. PCT/US2013/051981 dated May 2, 2014.

* cited by examiner

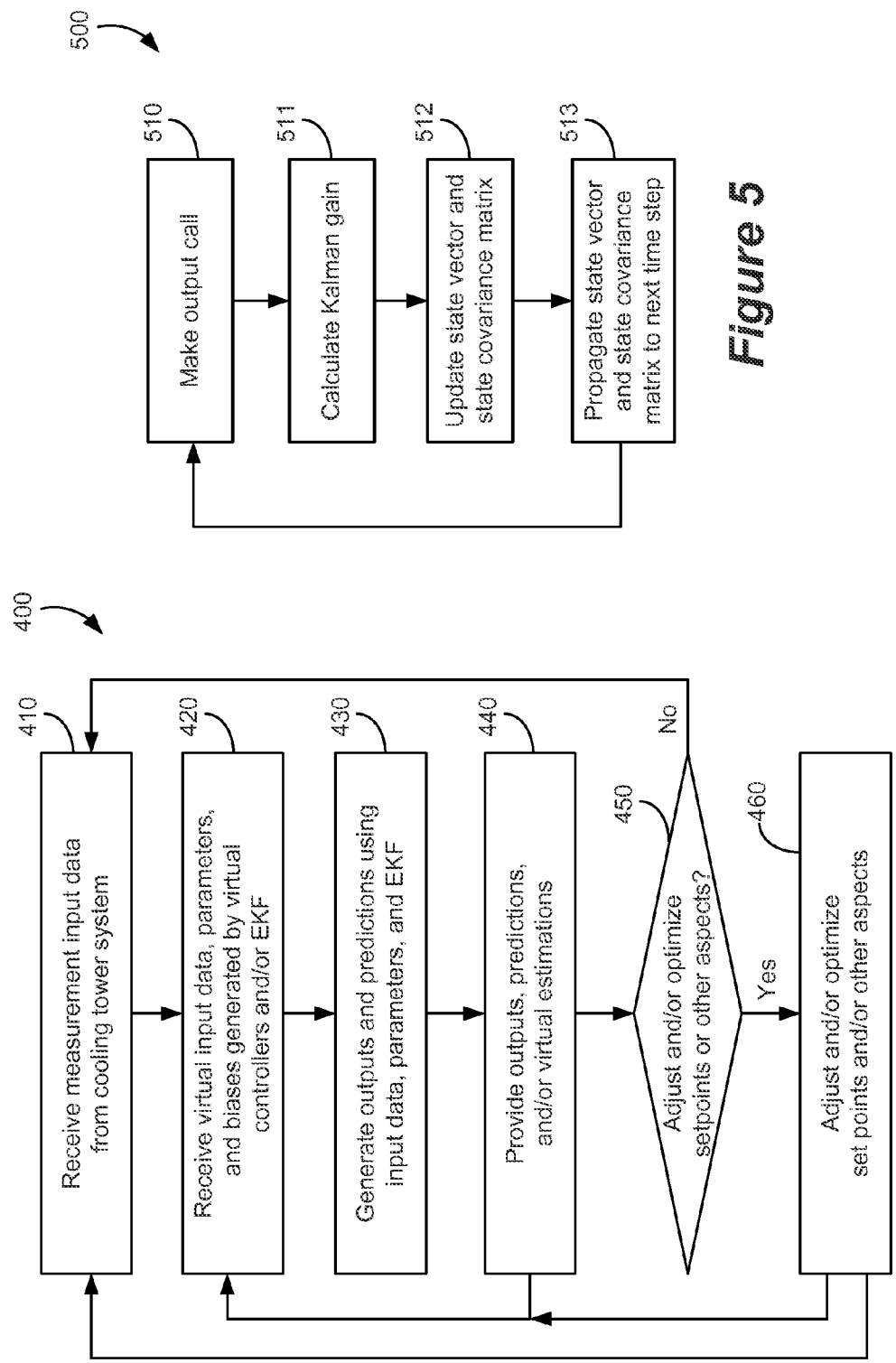

DYNAMIC MONITORING, DIAGNOSIS, AND CONTROL OF COOLING TOWER SYSTEMS

TECHNICAL FIELD

The present disclosure relates to cooling towers generally and in particular to methods and systems for monitoring and controlling cooling towers and diagnosing cooling tower problems.

BACKGROUND

Cooling towers are used to cool the water and other liquids that are circulated through various systems to remove heat from those systems. Such systems are widely varied, but are typically large scale and/or industrial systems such as power plants, manufacturing plants, chemical plants, oil refineries, and large scale heating, ventilation, and air conditioning (HVAC) systems. Cooling towers are monitored routinely to confirm normal operation. This monitoring is typically done by service personnel at the site of the cooling tower or remotely by receiving data from sensors configured to detect various measurements at the cooling tower. A common issue in monitoring cooling towers is the accuracy of the sensors being used to measure characteristics of the cooling tower, related components, and substances therein. Because these measurements may be used to diagnose problems with cooling tower systems, it is important that accurate measurements are available. For example, it may be costly and perhaps even detrimental to the system being cooled by a cooling tower if a problem, such as a high pH of cooling tower water, is diagnosed based on measurements from a biased pH sensor. Steps taken to correct a detected, but inaccurately measured, pH issue may adversely affect the pH and other aspects of the cooling tower and possibly the larger system in which the cooling tower is configured.

BRIEF DESCRIPTION OF THE INVENTION

In an exemplary non-limiting embodiment, a cooling tower simulation system may receive a measurement from a cooling tower sensor and generate a predicted output of a cooling tower system based on a model of the cooling tower system. The simulation system may generate an estimated output using an extended Kalman filter with the measurement and the predicted output as inputs, wherein the estimated output represents a characteristic of the cooling tower system.

In another exemplary non-limiting embodiment, a method is disclosed for receiving a measurement from a cooling tower sensor and generating a predicted output of a cooling tower system based on a model of the cooling tower system. An output may be generated using an extended Kalman filter with the measurement and estimated measurement as inputs.

In another exemplary non-limiting embodiment, a computer-readable storage device is disclosed that may include instructions for receiving a measurement from a cooling tower sensor and generating a predicted output of a cooling tower system based on a model of the cooling tower system. An estimated output may be generated using an extended Kalman filter with the measurement and the predicted output as inputs, wherein the estimated output represents a characteristic of the cooling tower system.

The foregoing summary, as well as the following detailed description, is better understood when read in conjunction with the drawings. For the purpose of illustrating the claimed subject matter, there is shown in the drawings examples that illustrate various embodiments; however, the invention is not limited to the specific systems and methods disclosed.

BRIEF DESCRIPTION OF THE DRAWINGS

These and other features, aspects, and advantages of the present subject matter will become better understood when the following detailed description is read with reference to the accompanying drawings, wherein:

FIG. 4 is a flowchart of a non-limiting exemplary method of implementing a cooling tower system simulation model.

FIG. 5 is another flowchart of a non-limiting exemplary method of implementing a cooling tower system simulation model.

DETAILED DESCRIPTION OF THE INVENTION

Figure 1:
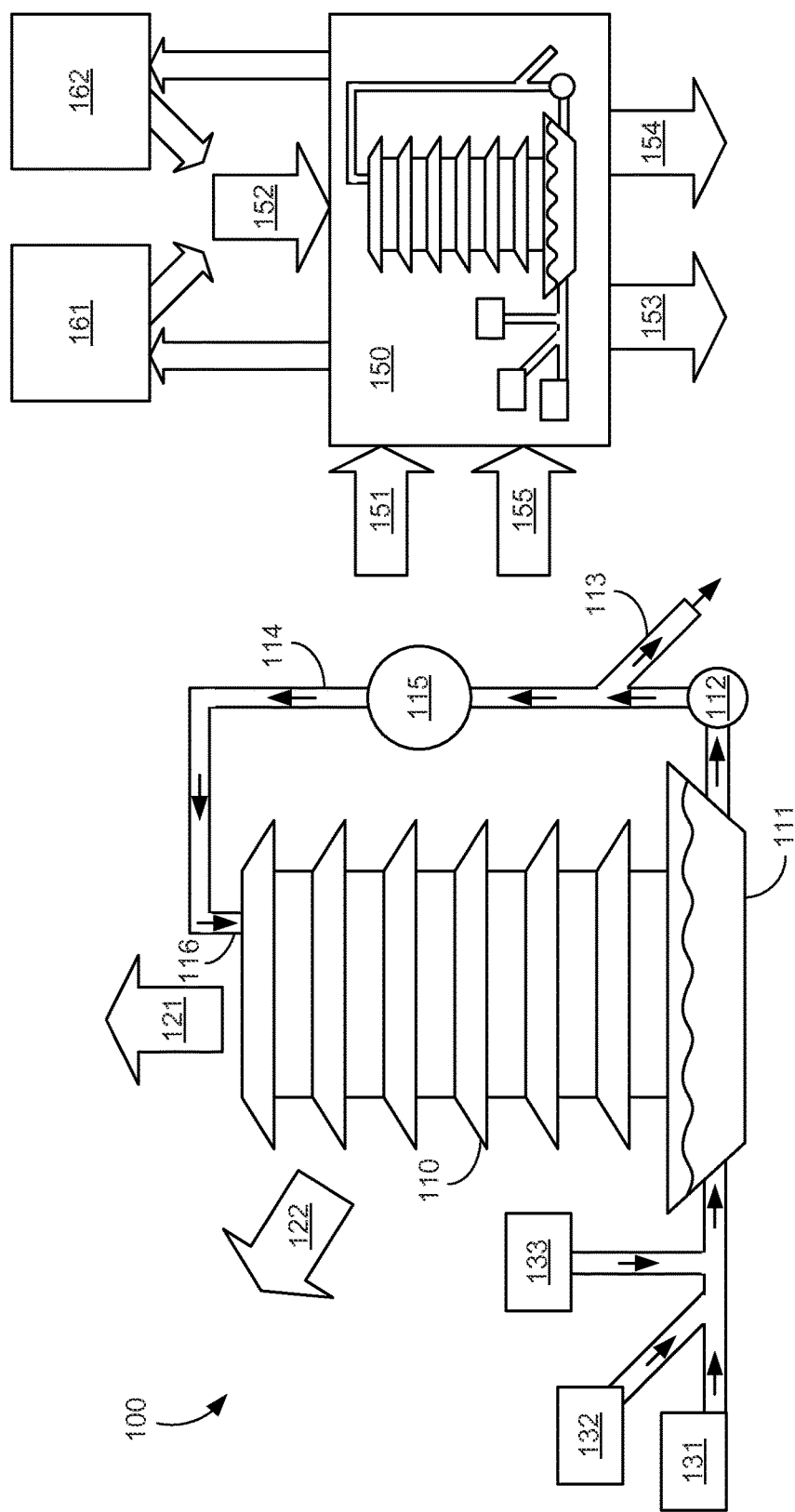
FIG. 1 is a block diagram of a non-limiting exemplary cooling tower system and cooling tower system simulation model.

FIG. 1 illustrates a simplified exemplary non-limiting cooling tower system 100. Cooling tower system 100 may include tower 110 that may be used to circulate and cool water from basin 111. Water may be pumped from basin 111 through tower 110 with circulation system 114. Note that circulation system is illustrated outside of tower 110 for explanatory purposes, and may be configured within tower 110 or in any other manner, and all such embodiments are contemplated as within the scope of the present disclosure. Circulation system 114 may include pump 112 that pumps water for basin 111 through process coolers 115 and then inlet 116 to tower 110. Circulation system 114 may have blowdown 113 that may be used to release water from cooling tower system 100. Alternatively, one or more blowdown or draw-off components may be configured in cooling tower system 100, and each of these may be configured at any section or component of cooling tower system 100.

Water (and/or other cooling tower system fluids) may be lost in various ways. Water may evaporate 121 from cooling tower system 100 as part of the normal functioning of cooling tower system 100. Water may also be lost 122 for various other reasons, such as leakage and windage (i.e. water droplets escaping from the system). Through the use of blowdown 113, water may be intentionally removed from cooling tower system 100, for example, to allow for the introduction of clean water in order to reduce the concentration of materials such as minerals in the water. In order to add water to cooling tower system 100 to maintain a consistent volume of water, make-up 131 may provide fresh water to cooling tower system 100.

Other materials may also be added to the water of cooling tower system 100. Component 132 represents any one or more components that may be configured in cooling tower system 100 to add substances to the water of the system. For example, component 132 may provide biocides (oxidizing and/or non-oxidizing), polymers, corrosion inhibitors, phosphates, and any other substance to the water of cooling tower system 100. Component 133 may be another component that may add substances to the water of cooling tower system 100, such as acids. Any number and type of components that may add any type of substance to the water of cooling tower system 100 are contemplated as within the scope of the present disclosure.

In an embodiment, simulation model 150 of cooling tower system 100 may be executed as software, hardware or a combination thereof, configured on one or more computing systems that may be located proximate to, or remote from, cooling tower system 100. Simulation model 150 may use various inputs and retrieve data in order to produce outputs that may be used to monitor, control, and diagnose problems with cooling tower system 100.

In an embodiment, simulation model 150 may receive input/output measurement data 151 and/or 155 from cooling tower system 100. Input/output measurement data 151 and/or 155 may be data that is transmitted, retrieved, or otherwise obtained from one or more sensors of any type at cooling tower system 100 and may be used to exercise simulation model 150. In an embodiment, such sensors may provide measurements of various characteristics of the water within cooling tower system 100. As measured input data 151 may be obtained directly from such sensors, any bias in the sensors will be included in such data, correction and detection of which is addressed by the embodiments set forth herein.

Estimated bias and parameter data 152 may also be provided to, or obtained by, simulation model 150. In an embodiment, simulation model 150 may obtain or receive such estimated bias data from an extended Kalman filter as described herein. Estimated bias and parameter data 152 may include stored historical data, adjustments that may be made to measured input data 151 to account for estimated bias in sensors at cooling tower system 100, and any other data, examples of which are provided herein.

In an embodiment, simulation model 150 may use proportional-intergral (PI) virtual controller 161 and/or dynamic inversion (DI) virtual controller 162 to compute one or more inputs and/or parameters of the system, as discussed herein. Each of controllers 161 and 162 may receive data through simulation model 150, such as actual measurement data received by simulation model 150 from cooling tower system 100 (e.g. measured input data 151 and/or actual measured output data 155, discussed below) and/or output predictions from the simulation model 150 (e.g., measured outputs 153 and generated data 154, discussed below), that each controller may use to generate its respective data that is then provided to simulation model 150 to assist in generating a more accurate model of actual cooling tower system 100. Estimated bias and parameter data 152 may include such virtual controller generated data. Either or both of virtual controllers 161 and 162 may be used to track, adjust, and/or generate values that cannot be easily measured in a cooling tower system. For example, flowrates (e.g., blowdown flowrate, make-up flowrate, etc.), evaporation rates, and other characteristics of a cooling tower system may be estimated or inferred by virtual controllers 161 and/or 162 based on measurements received at the controllers, such as conductivity and tracer data. The virtual controllers may adjust the flowrates accordingly to make the characteristics of the simulation model match those of the actual tower system. As part of this process, the virtual controllers may back-calculate values for flowrates, etc. to improve the integrity of the model. Note that there may be any number of virtual controllers of any type in simulation model 150 and any other embodiments, and all such embodiments are contemplated as within the scope of the present disclosure.

Simulation model 150 may use measured input data 151 and estimated bias and parameter data 152 to generate predictions of measured outputs 153 that may be used for comparison purposes to actual measured output data 155 that may be received or obtained from cooling tower system 100 to diagnose issues with the system. Predictions of measured outputs 153 may also be used for other purposes including those set forth herein.

Simulation model 150 may also use measured input data 151, measured output data 155, and/or estimated bias and parameter data 152 to generate data 154 that may describe characteristics of cooling tower system 100 that may not be directly or easily measureable. For example, generated data 154 may be used to determine, estimate, or predict corrosion levels, deposition levels, biofouling, and other characteristics of cooling tower system 100, some of which are described herein. Such data may be based on correlations found in data representing cooling tower characteristics. Data-based identification methods may be used to infer missing key performance indicators (KPIs) and/or other characteristics of a cooling tower system that may be included in generated data 154. For example, measureable output data for a cooling tower system, such as delta $PO_4$ (i.e., difference between total $PO_4$ and soluble $PO_4$), corrosion levels, deposition levels, and bio-fouling levels, may be used to infer other characterizes of the system. In an embodiment, such inferences may be based solely on available historical data, while in other embodiments, a hybrid approach may be used where measured cooling tower system data and historical data are used in combination. All such embodiments are contemplated as within the scope of the present disclosure.

Figure 2:
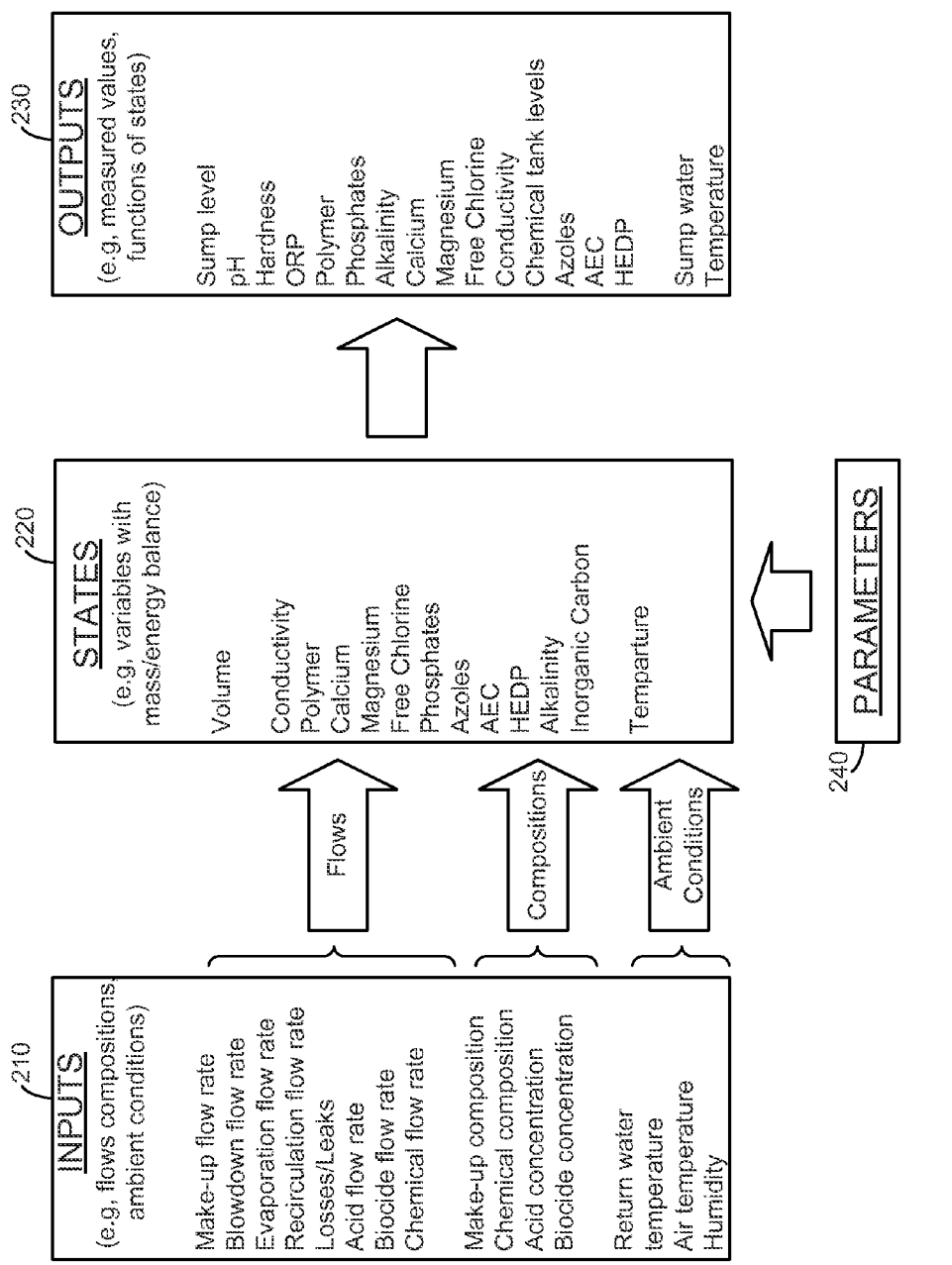
FIG. 2 is a block diagram of a non-limiting exemplary cooling tower system simulation model structure.

FIG. 2 is a chart of exemplary structure of a simulation model including input variables, state variables, output variables, and parameters that may be used and/or generated by a simulation model such as simulation model 150. Note that the inputs, states, and outputs shown in FIG. 2 are exemplary and not intended to limit the scope of the present disclosure in any way. Input variables 210 may be any data that may be input into a simulation system, including flow data, composition data, and ambient condition data. This data may be obtained in real-time or near-real-time from sensors at a cooling tower system, or periodically from such sensors. Input variables 210 may include historical, adjusted, and/or processed data based on sensor data, data from virtual controllers (e.g., virtual controllers 161 and 162), or any other data.

State variables 220 may be any states of a cooling tower system, including levels and concentrations of material in water in the system, volume of water, temperature and other ambient conditions, etc. These states may be altered based on input variables 210 and/or any type of processing thereof. The values of each of state variables 220 may be tracked and historical data may be analyzed to determine how the states change over time.

Parameters 240 may be any parameters that may assist in making a simulation model more accurately represent an actual cooling tower system. By tailoring parameters 240 to known values corresponding to an actual cooling tower system, a more accurate model may be implemented. By using flexible parameters, a more generic model may be implemented, for example in software, and tailored to model a particular cooling tower system by adjustment of parameters 240.

Output variables 230 may be any outputs that indicate characteristics of interest. Output variables 230 may be generated by processing the combination of inputs, states, and parameters. In an embodiment, data-based correlations may be used to determine estimates of any of these inputs, states, and parameters where such actual measured or calculated data is not available, or in addition to actual measured or calculated data.

In many cooling tower systems, data for periods of time of interest for particular inputs may not be available. For example, where a sample of the water in a system has to be analyzed by a lab and is collected only periodically (e.g., weekly, monthly, etc.), data from that sample is not available before or while the analysis is ongoing, and data is not available for interim time periods for which no sample was collected. In an embodiment, calculations may be performed by a simulation model to estimate the value of variables for a time for which actual measured data is not available. Similarly, a simulation model as described herein may determine values for variables that represent measurements that are not actually taken. For example, where a blowdown flow rate is not measured, but the blowdown and make-up conductivities and the make-up flowrate are available, a simulation model may use a proportional-integral (PI) or dynamic inversion (DI) controller to compute the blowdown flow rate from the cooling tower.

In an embodiment, an extended Kalman filter (EKF) may be built around the structure of a simulation model, such as the structure shown in FIG. 2. According to such an embodiment, an EKF may use various inputs to generate outputs that may be used to exercise a dynamic simulation model of a cooling tower system. An EKF may generate predictions of, for example, a set of measured outputs, correct such predictions, and may generate estimations of values of characteristics and parameters of a cooling tower system, including generating corrected or adjusted values of measured output data in order to address bias that may be present in the sensors originating such data.

Figure 3:
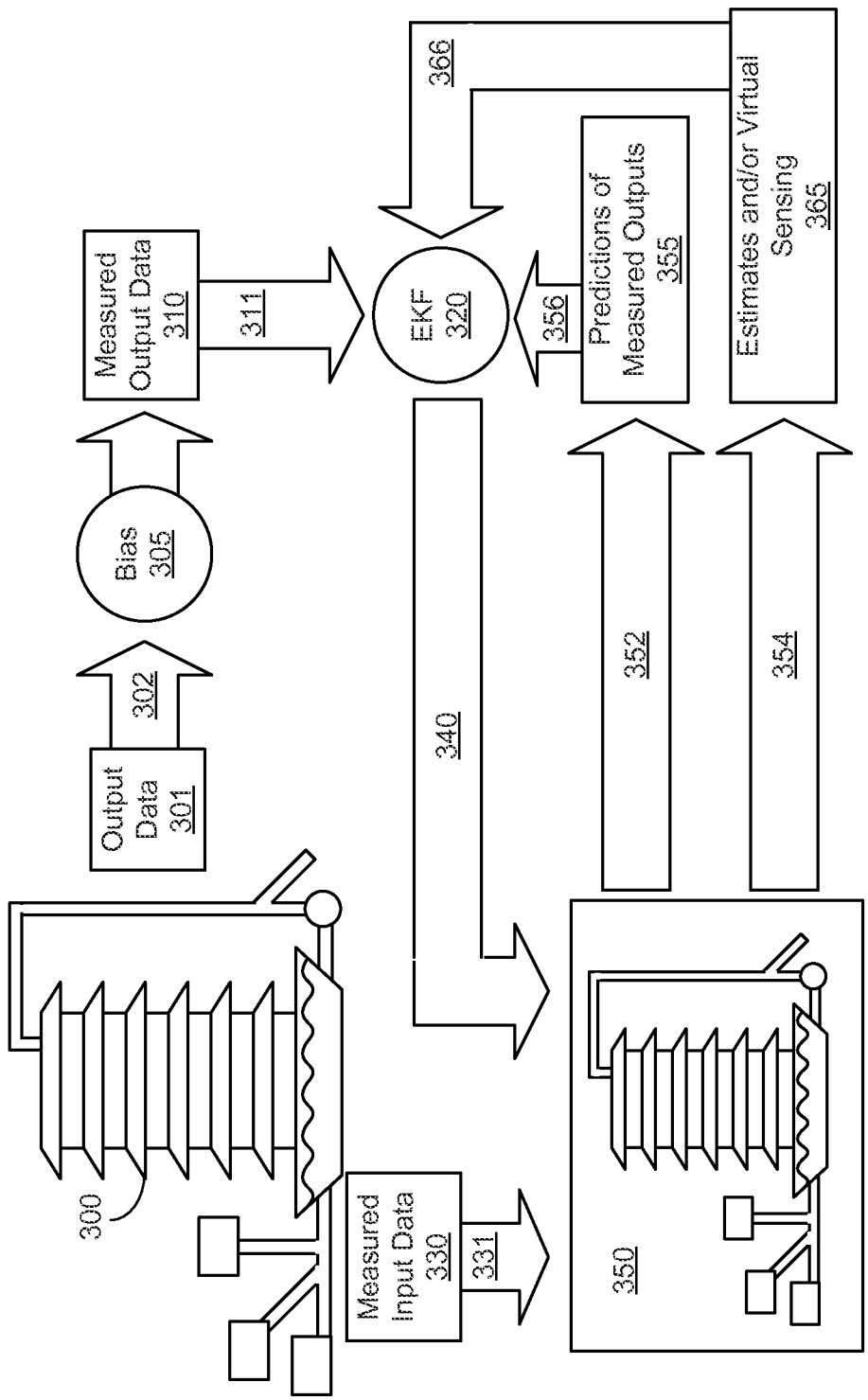
FIG. 3 is a block diagram of a non-limiting exemplary cooling tower system simulation model and extended Kalman filter structure.

For example, referring now to FIG. 3, cooling tower system 300 and/or sensors configured therein may generate output data 301 (examples of which may be seen in output variables 210 of FIG. 2). However, due to sensor bias 305, such output data may be inaccurate, resulting in measured output data 310. Measured output data 310 may be provided 311 to EKF 320. As a result of processing by EKF 320, corrected or adjusted measured output data may be provided 340 to cooling tower system simulation model 350. Cooling tower simulation model 350 may also receive 331 measured input data 330 from cooling tower system 300 and/or sensors configured therein.

Cooling tower simulation model 350 may also feed back results of its simulation to EKF 320 for further refinement of the simulation model so that cooling tower system simulation model 350 more closely models actual cooling tower system 300. For example, cooling tower system simulation model 350 may generate 352 predictions of measured outputs 355 (examples of which may be seen in output variables 230 of FIG. 2) that may be provided 356 to EKF 320. Cooling tower system simulation model 350 may also generate 354 estimates and/or virtual sensor data 355 (examples of which may be seen in output variables 230 of FIG. 2) that may be provided 366 to EKF 320.

Predictions of measured outputs 355 may be compared with the measured output data 310 taken for the corresponding outputs at cooling tower system 300. Any differences between the predicted and the measured outputs may be multiplied with the Kalman gain of EKF 320 to update a specific set of state variables (e.g., state variables 220 in FIG. 2) of cooling tower system simulation model 350. Artificial state variables used by cooling tower system simulation model 350 that describe adapted parameters of the model and/or that describe the measured output biases may also be generated and/or updated.

Certain variables of cooling tower systems may not be measured using sensors or physical measurements, or may not have data available for certain time periods, for example due to expense or availability of monitoring technology or lack of monitoring during certain time periods. For such variables, EKF and the disclosed dynamic simulation models may be used to provide "virtual measurements" of these variables. One or more of the state variables (e.g., state variables 220 in FIG. 2) of a simulation model may be generated and/or updated using data-based correlations (e.g., using historical variable data), using proprietary methods or software, and/or using additional physical relations (e.g., relating model states and outputs to key performance indicators (KPIs)). These additional means of generating and/or updating certain variables may allow embodiments using an EKF to define key process variables for cooling tower systems, such as bio-fouling, deposition, leaks, and corrosion. Using the EKF with such key process variables may also allow KPIs to be improved with a real-time optimizer. In an embodiment, key process variables and other parameters of an operating cooling tower system may be adjusted based on estimates generated by an EKF to improve the operation and performance of the cooling tower system.

As known to one skilled in the art, an EKF is a non-linear Kalman filter that uses a series of measurements observed over time. The EKF will produce estimates of unknown variables that may be more accurate than other means. In an embodiment, where historical measurements may be missing for a particular time period or subset of a time period (for example, because such measurements were not collected during the time period in question), or simply may not be available at all, a virtual controller (e.g., PI virtual controller, DI virtual controller) may calculate the missing input measurements, which may then be used in the simulation model using an EKF.

For example, as noted above, a virtual controller may be configured to track blowdown conductivity and/or tracer measurements to infer a blowdown flow rate that is then provided to a simulation model. This method of determining blowdown flow rate may provide a more accurate estimation of blowdown flow rate than a steady-state inferred method using a cycle of concentration calculation. Similarly, a virtual controller may be configured to infer a make-up flow rate where actual make-up flow rate measurements are not available based on tracking make-up conductivity and/or tracer data. In another embodiment, a virtual controller may track a sump-level to infer an evaporation rate out of the system. In yet another embodiment, a virtual controller may use tank-level measurements (either alone, or in combination with pump data consolidated by a Kalman filter) to infer and/or correct chemical, acid, and/or bleach delivery rates to a cooling tower. In such embodiments, the inferred rates may be dynamically and/or continuously updated as additional measurement data may be received by the controller(s). This embodiment provides a flexibility that allows a simulation model to reflect a specific cooling tower system.

In an embodiment, data-based identification methods may be used to infer missing KPI outputs in a simulation model. Such outputs may include delta $PO_4$ (phosphate), corrosion variables, deposition variables, and bio-fouling variables.

Such methods may use solely historical data or use data generated by the simulation model in combination with historical data.

By using a combination of measured data and calculated or generated data, a simulation model may be encapsulated in an EKF to determine the presence and degree of bias or other problems that may be present in measurement devices configured in a cooling tower system. In an embodiment, an EKF may identify biases and bias variances that may be used to diagnose drifting and/or malfunctioning measurement devices. For example, outputs generated by a simulation model may be compared to actual measured outputs to determine a difference that may indicate a bias in a measuring device. Measured output data and estimated output data may each be time stamped and stored for such comparison. An EKF may also identify scale factors on key chemical, acid, and bleach delivery systems to diagnose drifting and/or malfunctioning metering devices. By using a simulation model that incorporates an EKF and parameters within such a model that are based on current knowledge of an actual cooling tower system, uncertainty in scale factors and biases may be reduced.

Such a simulation model may also allow the dynamic updating of key model parameters to adapt a generic model to specific cooling tower system and/or site and to adapt to changing site conditions. For example, make-up compositions may change over time due to various factors, such as source, season, etc. As a result of these changes, various setpoints within the cooling tower system may be adjusted to maintain a desired state of the cooling tower system.

More accurate estimation and prediction of key process variables, as provided by the disclosed embodiments, may be used to adjust setpoints of cooling tower system control loops. For example, pH setpoints and phosphate solubility setpoints may be adjusted up or down (in an embodiment, within predetermined acceptable ranges) based on virtual estimations of corrosion and deposition. The present embodiments provide methods to improve the observability of KPIs that are not directly measured by perturbing available inputs to the system and letting EKF infer the unmeasured KPIs by utilizing the transient response of measured variables. The disclosed embodiments provide feedforward and/or feedback control algorithms for the regulation of KPIs that are robust to unexpected disturbances and measurement errors.

For example, in some embodiments it may be desired that certain variables remain within a specified range. It may be desired that pH, polymers, $PO_4$, and/or delta $PO_4$ remain within certain ranges. $PO_4$ may be used in such a system to prevent corrosion; however, the portion of $PO_4$ in the system that is not soluble may not be effective at preventing corrosion. Therefore, in an embodiment, a polymer may be added to the water in a cooling tower system to keep $PO_4$ soluble (i.e., maintain delta $PO_4$ within a certain range). Relatedly, the concentration of $PO_4$ in the system, as well as the concentration of other materials in the water, may be adjusted by controlling the incoming make-up water, outgoing blowdown water, and/or chemical product flow to maintain the levels of those materials within certain ranges. By using predictions of unmeasured variables that may be generated by a simulation model using an EKF, in an embodiment in combination with associated confidence intervals, a determination may be made as to when such variables may fall outside the desired range and steps may be taken in advance to avoid such a scenario. In one embodiment, leaks may be estimated using various estimated variables, and the flow of make-up water may be adjusted accordingly. In another example, free chlorine bias estimations may be used to infer a biological load on the system, and thus steps to take to address such a load, such as changing a setpoint for a chemical addition to the tower water.

However, in situations such as when a reaction rate of chlorine goes up, there may be more than one potential issue to address, or it may be unclear as to the primary cause. In this example, there is likely more biomass in the tower water, but there is also a possibility of the incoming make-up water having a higher level of organic material than it previously had. In some embodiments, setpoints and other aspects of an actual cooling tower system may be adjusted for the purpose of increasing the observability of unmeasured performance variable. Such exercising of perturbations of a cooling tower system may include shot feeding oxidizing and/or nonoxidizing biocides into the tower water and monitoring the transient response of free chlorine and/or oxidation reduction potential (ORP). This may provide estimated variables that more clearly define the actual issue, and therefore the steps needed to address the issue. Any other manipulations of a cooling tower system for the purposes of improving observability of one or more unmeasured variables are contemplated as within the scope of the present disclosure.

In an embodiment, a cooling tower system may be controlled and adjusted based on the predicted and estimated outputs of a simulation model of that cooling tower system. For example, feedforward and feedback controls may be used for improved regulation of the tower. In an embodiment, a cascade control loop with polymer concentration at an inner loop and estimated delta $PO_4$ at an outer loop may be used to operate a cooling tower system within desired ranges while keeping the system robust to disturbances and measurement errors. For example, a control architecture using a virtual estimation of calcium and/or magnesium hardness may be used to adjust cycles of concentration. In this example, cascade control loop, hardness may be at the outer loop with conductivity at the inner loop. Alternatively, a constraint architecture based on minimum/maximum selection may be used.

Other controls may be implemented based on estimated and/or predicted measurements generated by a simulation model. For example, pH and delta $PO_4$ setpoints may be adjusted up or down within a predetermined range based on estimated corrosion, deposition, and/or a ratio of corrosion to deposition.

Note that ranges and setpoints may be determined based on many factors, including economics, reliability, and efficiency. For example, a set point may be adjusted to minimize overall operating expenses, such as minimizing chemical use, water use, and/or energy use. Such results may be achieved through changing water quality and heat loads while protecting asset health using virtual sensed and predicted values of corrosion, deposition, and bio-fouling.

FIG. 4 illustrates exemplary, non-limiting method 400 of implementing an embodiment of a cooling tower system simulation model as disclosed herein. Method 400, and the individual actions and functions described in method 400, may be performed by any one or more devices or components, including those described herein. In an embodiment, method 400 may be performed by any other devices, components, or combinations thereof, in some embodiments in conjunction with other systems, devices and/or components. Note that any of the functions and/or actions described in regard to any of the blocks of method 400 may be performed in any order, in isolation, with a subset of other functions and/or actions described in regard to any of the other blocks of method 400 or any other method described herein, and in combination with other functions and/or actions, including those described herein and those not set forth herein. All such embodiments are contemplated as within the scope of the present disclosure.

At block 410, measured input data may be received from a physical cooling tower system at a system in order to execute a simulation model. This may be data received from sensors and/or other devices configured at a cooling tower system that may be received automatically. This data may also, or instead, include measurements that are collected, analyzed, and processed manually. Any data that is the result of or reflects physical or actual measurement of any trait, characteristic, or aspect of a cooling tower system is contemplated as within the scope of the present disclosure.

At block 420, virtual input data and parameters may be received or obtained by a system that may be executing virtual controllers and an EKF. For example, virtual and/or estimated inputs generated earlier for measurements that are not available from physical measurements may be retrieved from memory or data storage. Determined biases may also be retrieved, as well as any parameters that are configured in the virtual controllers and EKF executed by the system to reflect the corresponding physical cooling tower system.

At block 430, outputs and/or predictions may be generated by the system executing a simulation model using the various inputs, parameters, and an EKF. At block 440, outputs and/or predictions may be provided to another system, a user, and/or to a storage device for future use. Any means of providing outputs and predictions may be used. Such outputs and predictions may also be provided as inputs for a next simulation, returning to block 420.

Based on the outputs and predictions of block 440, at block 450 a determination may be made as to whether any adjustment, control, and/or improvement of setpoints or any other aspect of a physical cooling tower system are to be performed. If not, the method may return to block 410 for the next simulation. If adjustments, control, and/or improvements are to be made, at block 460, setpoints and/or other aspects of the cooling tower system may be adjusted. These adjustments may be stored or otherwise provided for the simulation model to use for the next simulation at block 420, and the method may also return to begin another simulation at block 410. Note that adjustments may be made automatically or manually, and may or may not require the intervention of a user.

Presented below are some exemplary equations that may be used by a cooling tower system simulation model to determine outputs, predictions, and adjustments, as well as to perform other calculations that may be used to operate a cooling tower system. Note that any of the equations set forth herein may be used in isolation, with a subset of any other equations described herein, or in combination with any other equations, including those described herein and those not set forth herein. All such embodiments are contemplated as within the scope of the present disclosure.

Equation (1) below may be used for material balance for water in a whole tower:

$$\frac{dV}{dt} = q_m - q_{bd} + \sum_j q_j - q_v - q_{loss} + q_{leak} \quad (1)$$

where $q_m$ is the make-up flowrate, $q_{bd}$ is the blowdown flowrate, $q_j$ represents the flowrates of different chemical product streams entering the tower basin, $q_v$ represents the lost liquid flowrate as vapor, $q_{loss}$ represents the losses from the system, and $q_{leak}$ represents the leaks into the system.

For every species i considered for the cooling tower system a general material balance may be constructed using equation (2):

$$V\frac{dC_i}{dt} = q_m(C_{i,m} - C_i) + \sum_j q_j(C_{i,j} - C_i) - r_i + q_v C_i \quad (2)$$

where $C_{i,m}$, is the concentration of the $i^{th}$ species in the make-up, $C_i$, is the concentration of the species in the system, $C_{i,j}$ is the concentration of the $i^{th}$ species in the $j^{th}$ stream, and $r_i$ is the consumption of the species in the system.

By using equation (3), an overall energy balance may be constructed to monitor the heat-load on the system:

$$V\frac{dT}{dt} = q_m(T_m - T) + \sum_j q_j(T_j - T) - \frac{q_v \Delta h_{vap}}{C_p} r_i + q_r(T_{in} - T) \quad (3)$$

where T is the temperature of the system, $T_m$ is the temperature of the make-up, $T_j$ is the temperature of the $j^{th}$ stream, $\Delta h_{vap}$ is the latent heat of evaporization, $C_p$ is the specific heat capacity of water, and $q_r$ is the recirculation flowrate.

A dynamic simulation model of a cooling tower system may consist of one or more submodels (e.g., one or more submodels of chemical feed tanks, one or more submodels of cooling towers, etc.) that are connected through input-output connections to constitute an overall model. For the purposes of a generic EKF structure, submodels and how connections between them are represented may be defined within the overall model. Submodels may be described as ordinary differential equations (ODE) shown in equation (4):

$$\dot{x}_i = f_i(x_i, u_i)$$

$$y_i = g_i(x_i, u_i) \; i=1, \ldots, n_s \quad (4)$$

where i is the index of the submodel, and $n_s$ is the total number of submodels present in the overall system, $x_i \in \mathbb{R}^{n_{x,i}}$ are submodel i's states, $u_i \in \mathbb{R}^{n_{u,i}}$ are submodel i's inputs, and $y_i \in \mathbb{R}^{n_{y,i}}$ are submodel i's outputs. In order to define the overall system similar to the submodels as defined in Equation (4), the concatenated inputs, states, and outputs may be defined first as shown in equation (5):

$$X = [x_1 \ldots x_{n_s}]^T$$

$$U = [u_1 \ldots u_{n_s}]^T$$

$$Y = [y_1 \ldots y_{m_s}]^T \quad (5)$$

where $X \in \mathbb{R}^{n_X}$ are the states, $U \in \mathbb{R}^{n_U}$ are the inputs, and $Y \in \mathbb{R}^{n_Y}$ are the outputs of the concatenated system. The sizes related to the overall system, $n_X$, $n_U$, and $n_Y$ are related to the submodel sizes as shown in equation (6).

$$n_X \triangleq \Sigma_{i=1}^{n_s} n_{x,i}$$

$$n_U \triangleq \Sigma_{i=1}^{n_s} n_{u,i}$$

$$n_Y \triangleq \Sigma_{i=1}^{n_s} n_{y,i}$$

The overall concatenated system may now be defined as shown in equation (7).

$$\dot{X} = F(X, U)$$

$$Y = G(X, U) \quad (7)$$

Note that an overall system model simulated in software may not be the same as that shown in equation (7) because many of the inputs to submodels may be outputs from other submodels, and simulation software may solve the overall interconnected nonlinear ODE system shown below in equation (8):

$$\dot{X} = \mathcal{F}(X, U_e)$$

$$Y = G(X, U_e) \quad (8)$$

where $U_e \in \mathbb{R}^{n_{U_e}}$ are the external inputs to the overall system. The external inputs to the overall system may be those submodel inputs that are left unconnected after all the connections between the submodels are established.

The system definitions presented in equation (7) and equation (8) may have many parameters that need to be defined in order to exercise the model and to ensure that the model resembles an actual physical cooling tower system. Many of the parameters of the model may reflect design information about the cooling tower system and are therefore not likely to vary with time. However, certain parameters of the model may vary with time and should be properly represented in the system definitions. If it is assumed that there are $n_p$ time-varying parameters of the model, the concatenated system of equation (7) becomes equation (9):

$$\dot{X} = F(X, U, p)$$

$$\dot{p} = \pi(X, U, p)$$

$$Y = G(X, U, p) \quad (9)$$

and the overall interconnected system definition of equation (8) becomes equation (10):

$$\dot{X} = \mathcal{F}(X, U_e, p)$$

$$\dot{p} = \pi(X, U, p)$$

$$Y = G(X, U_e, p) \quad (10)$$

Because the EKF implementation may be carried out in discrete-time, the previous system definitions may be converted to their discrete-time counterparts. In addition to the uncertain and time-varying parameters, the system definitions may be further refined to account for the uncertainty of the system model itself and the measurements. The concatenated system of equation (9) may become equation (11):

$$X_{k+1} = F_d(X_k, U_k, p_k, w_{X,k})$$

$$p_{k+1} = p_k + w_{p,k}$$

$$Y_k = G(X_k, U_k, p_k, v_{Y,k}) \quad (11)$$

and the overall interconnected system defined in equation (10) may become equation (12):

$$X_{k+1} = \mathcal{F}_d(X_k, U_{e,k}, p_k, w_{X,k})$$

$$p_{k+1} = p_k + w_{p,k}$$

$$Y_k = G(X_k, U_{e,k}, p_k, v_{Y,k}) \quad (12)$$

In equations (11) and (12) $w_X \in \mathbb{R}^{n_X}$, $w_p \in \mathbb{R}^{n_v}$ and $v_Y \in \mathbb{R}^{n_Y}$ are zero-mean, discrete-time white noises, the time-varying parameters are assumed to follow a random-walk model, and $F_d$, $\mathcal{F}_d$ are discrete counterparts of $F$ and $\mathcal{F}$, respectively. Furthermore, the EKF implementation may consider the persistent biases, $b \in \mathbb{R}^{n_b}$, in some of the measurements separately from the zero-mean white noise, rendering the concatenated system representation as equation (13):

$$X_{k+1} = F_d(X_k, U_k, p_k, w_{X,k})$$

$$p_{k+1} = p_k + w_{p,k}$$

$$b_{k+1} = b_k + w_{b,k}$$

$$Y_k = G(X_k, U_k, p_k, v_{Y,k}) + b_k \quad (13)$$

and the interconnected system representation as equation (14):

$$X_{k+1} = \mathcal{F}_d(X_k, U_{e,k}, p_k, w_{X,k})$$

$$p_{k+1} = p_k + w_{p,k}$$

$$b_{k+1} = b_k + w_{p,k}$$

$$Y_k = G(X_k, U_{e,k}, p_k, v_{Y,k}) + b_k \quad (14)$$

Another assumption made in the equations above is that the external inputs to the system have no uncertainty which may not be generally true. An improved representation of the external inputs may consider zero-mean white noise around the external input measurements as shown in equation (15):

$$X_{k+1} = \mathcal{F}_d(X_k, U_{e,k}, p_k, w_{X,k}, v_{U_e,k})$$

$$p_{k+1} = p_k + w_{p,k}$$

$$b_{k+1} = b_k + w_{b,k}$$

$$Y_k = G(X_k, U_{e,k}, p_k, v_{Y,k}, v_{U_e,k}) + b_k \quad (15)$$

where $v_{U_e,k} \in \mathbb{R}^{n_{U_e}}$.

The EKF used for a cooling tower system simulation model may readily linearize each submodel providing the linear concatenated system of equation (16):

$$\dot{X} = AX + B \begin{bmatrix} U \\ p \end{bmatrix}$$

$$Y = CX + D \begin{bmatrix} U \\ p \end{bmatrix} \quad (16)$$

starting from equation (7). Note that equation (16) is the linearization of the concatenated system and not the linearization of the interconnected system. In order to achieve the linearization of the interconnected system, the concatenated input vector U may be expressed as a function of the external input vector $U_e$ as shown in equation (17):

$$\begin{bmatrix} U \\ p \end{bmatrix} = M_y Y + M_{U_e} U_e. \quad (17)$$

Using the linearization of Y in equation (16) and equation (17), Y, as shown in equation (18), becomes:

$$Y = CX + DM_y Y + DM_{U_e} U_e. \quad (18)$$

In the EKF linearization machinery there may be no distinction between inputs and parameters, so the use of $[U\ p]^T$ in equations (17) and (18) may be misleading. In the EKF machinery there may be a large input vector that has U and p intermixed. In a software embodiment, U and p may be separated within the code before code for an EKF measurement update machinery is executed. The output vector may be solved from equation (18) as shown in equation (19):

$$Y = (I - DM_y)^{-1} CX + (I - DM_y)^{-1} DM_{U_e} U_e \quad (19)$$

that can be expressed concisely as equation (20):

$$Y = \ddot{C}X + \ddot{D}U_e \quad (20)$$

where $\ddot{C} \triangleq (I-DM_y)^{-1}c$ and $\ddot{D} \triangleq (I-DM_y)^{-3}DM_{U_e}$. The overall input vector then becomes equation (21):

$$\begin{bmatrix} U \\ p \end{bmatrix} = M_y \ddot{C} X + (M_y \ddot{D} + M_{U_e}) U_e. \quad (21)$$

By substituting equation (21) back to equation (16), the linearized system that corresponds to equation (8) may be obtained as equation (22):

$$\dot{X} = \ddot{A}X + \ddot{B}U_e$$

$$Y + \ddot{C}X + \ddot{D}U_e \quad (22)$$

where $\ddot{A} \triangleq A + BM_y \ddot{C}$ and $\ddot{B} \triangleq BM_y \ddot{D} + BM_{U_e}$. The linearized representation of the overall interconnected system of equation (22) may be a continuous-time representation. Trapezoidal discretization may be used to get to a discretized representation of equation (23):

$$A_k = \left(I - \frac{\ddot{A}T_s}{2}\right)^{-1}\left(I + \frac{\ddot{A}T_s}{2}\right) \quad (23)$$

$$B_k = \left(I - \frac{\ddot{A}T_s}{2}\right)^{-1} \frac{T_s}{2} \ddot{B}$$

$$C_k = \ddot{C}$$

$$D_k = \ddot{D}$$

where $T_s$ is the sampling time of the discrete-time system. The discrete-time linearized interconnected system may then be described by equation (24):

$$X_k = A_{k-1} X_{k-1} + B_{k-1} U_{e,k-1}$$

$$Y_k = C_k X_k + D_k U_{e,k} \quad (24)$$

Assuming the uncertainty around the external input measurements are additive (i.e., $U_{e,m} = U_e + v_{Ue}$, where $U_{e,m}$ is the measured external input, $U_e$ is the actual measured input, and $v_{Ue}$ is the external input measurement discrete time white noise), separating the effect of external inputs from the parameters, considering the measurement biases, and considering the uncertainties of the model, equation (24) may become equation (25):

$$X_k = A_{k-1} X_{k-1} + B_{U,k-1} U_{e,m,k-1} + B_{p,k-1} p_{k-1} + B_{U,k-1} + v_{U_e,k-1} + w_{X,k-1}$$

$$p_k = p_{k-1} + w_{p,k-1}$$

$$b_k = b_{k-1} + w_{b,k-1}$$

$$Y_k = C_k X_k + D_{U,k} U_{e,m,k} + D_{p,k} p_k + b_k + D_{U,k} v_{U_e,k} + v_{Y,k}. \quad (25)$$

Having the discrete-time nonlinear (equation (15)) and the discrete-time linear (equation (25)) representations of a cooling tower system, the EKF gain may now be computed. However, it may be beneficial to create an augmented state vector to simplify equation (25) which may in turn simplify the EKF gain computation. The augmented state vector may be defined as equation (26):

$$\chi_k \triangleq \begin{bmatrix} X_k \\ p_k \\ b_k \end{bmatrix}. \quad (26)$$

With the use of the augmented state vector of equation 26, the linearized system of equation (25) may become equations (27) and (28):

$$\chi_k = \underbrace{\begin{bmatrix} A_{k-1} & B_{p,k-1} & 0 \\ 0 & I & 0 \\ 0 & 0 & I \end{bmatrix}}_{A_{k-1}} \chi_{k-1} + \quad (27)$$

$$B_{U,k-1} U_{e,m,k-1} + B_{U,k-1} v_{U_e,k-1} + \begin{bmatrix} w_{X,k-1} \\ w_{p,k-1} \\ w_{b,k-1} \end{bmatrix},$$

$$Y_k = \underbrace{[C_k \quad D_{p,k} \quad I]}_{c_k} \chi_k + D_{U,k} U_{e,m,k} + D_{U,k} v_{U_e,k} + v_{Y,k}. \quad (28)$$

Using the propagated state estimate from the last time step, $X_{k|k-1}$, the propagated state covariance from the last time step, $P_{k|k-1}$, the state matrices resulting from the linearization of the nonlinear cooling tower system simulation model ($A_k$, $B_{U,k}$, $C_k$, and $D_k$), the external input at the current time step, $U_{e,m,k}$, and the covariance of discrete-time white noise on the outputs, $R_Y$, the covariance of discrete-time white noise on the external inputs, $R_U$, the Kalman gain for the current time step, $K_k$, may be calculated. The state estimates and the state covariance may then be updated to the current time step with the use of the Kalman gain, the measured outputs from the cooling tower system, $Y_k$, the process noise covariance of the augmented state, $Q_X$, the process noise covariance of the biases, $Q_b$, and the process noise covariances of the parameters, $Q_p$.

Given $X_{k|k-1}$, the measurement vector $Y_k$, and the state matrices of time k, method 500 of FIG. 5 may be performed to implement an EKF in an embodiment of a cooling tower system simulation model. Method 500, and the individual actions and functions described in method 500, may be performed by any one or more devices or components, including those described herein. Note that any of the functions and/or actions described in regard to any of the blocks of method 500 may be performed in any order, in isolation, with a subset of other functions and/or actions described in regard to any of the other blocks of method 500 or any other method described herein, and in combination with other functions and/or actions, including those described herein and those not set forth herein. All such embodiments are contemplated as within the scope of the present disclosure.

At block 510, an output call may be made using equation (29):

$$\hat{Y}_k = G(X_{k|k-1}, U_{e,m,k}) \quad (29)$$

At block 511, the Kalman gain may be calculated using equation (30):

$$K_k = (P_{k|k-1} C_k^T)(C_k P_{k|k-1} C_k^T + R_Y + D_k R_U D_k^T)^{-1}. \quad (30)$$

At block 512, the state vector and state covariance matrix may be updated using equations (31) and (32):

$$X_{k|k} = X_{k|k-1} + K_k(Y_k - \hat{Y}_k) \quad (31)$$

$$P_{k|k} = (I - K_k \hat{C}_k)P_{k-1}(I - K_k \hat{C}_k)^T + K_k R_Y K_k^T + K_k D_k R_U D_k^T K_k^T \quad (32)$$

At block 513, the state vector and state covariance matrix may be propagated to the next time step, as shown in equations (33) and (34), and the method may return to block 510 for continued execution:

$$\chi_{k+1|k} = \begin{bmatrix} \mathcal{F}_d(\chi_{k|k}, U_{e,m,k}) \\ p_{k|k} \\ b_{k|k} \end{bmatrix} \quad (32)$$

$$P_{k+1|k} = A_k P_{k|k} A_k^T + Q_X + B_{U,k} R_U B_{U,k}^T - A_k K_k D_k R_U B_{U,k}^T - B_{U,k} R_U D_k^T K_k^T A_k^T, \quad (34)$$

where $Q_X = \text{diag } [Q_X \; Q_p \; Q_b]$, $Q_X \triangleq E[w_{X,k} w_{X,k}^T]$, $Q_p \triangleq E[w_{p,k} w_{p,k}^T]$, $Q_b \triangleq E[w_{b,k} w_{b,k}^T]$, $R_U \triangleq E[v_{U_e,k} v_{U_e,k}^T]$, and $R_Y \triangleq [v_{Y,k} v_{Y,k}^T] \forall k$.

Note that linearization as disclosed herein may be carried out using $X_{k|k}$, but the state-space matrices herein may be named with the subscript k for brevity. Also, the linearization may be carried out again with the updated state vector, $X_{k|k}$ to improve accuracy. Method 500 does not explicitly provide for this update of linearization, which may not be performed due to time constraints and because the linearization is unlikely to change drastically between k|k−1 and k|k and b to reduce the computational load.

In an embodiment, EKF as used in a cooling tower system simulation model may allow for the scaling of state covariances, states, and outputs in order to provide a better condition number of the matrix, $(C_k P_{k|k-1} C_k^T + R_Y + D_k R_U D_k^T)$, that has to be inverted during the computation of the Kalman gain, $K_k$. The state vector, X, may be scaled with the matrix square root of the initial state covariance, $P_0$ as shown in equation (35).

$$\bar{X} = \sqrt{P_0^{-1}} X \quad (35)$$

The outputs may also be scaled using the output measurement noise covariance matrix, $R_Y$, as shown in equation (36).

$$\bar{Y} = \sqrt{R_Y^{-1}} Y \quad (36)$$

As one skilled in the art will recognize, the state-space matrices of the system may also be scaled according to one or both of equations (35) and (36).

The technical effect of the systems and methods set forth herein is more efficient and operation of a cooling tower system and improved ability to detect and diagnose problems with such a system. As will be appreciated by those skilled in the art, the use of the disclosed processes and systems may reduce the operating costs and improve the performance of a cooling tower system. Those skilled in the art will recognize that the disclosed systems and methods may be combined with other systems and technologies in order to achieve even greater cooling tower system control and improvement of operation. All such embodiments are contemplated as within the scope of the present disclosure.

Figure 6:
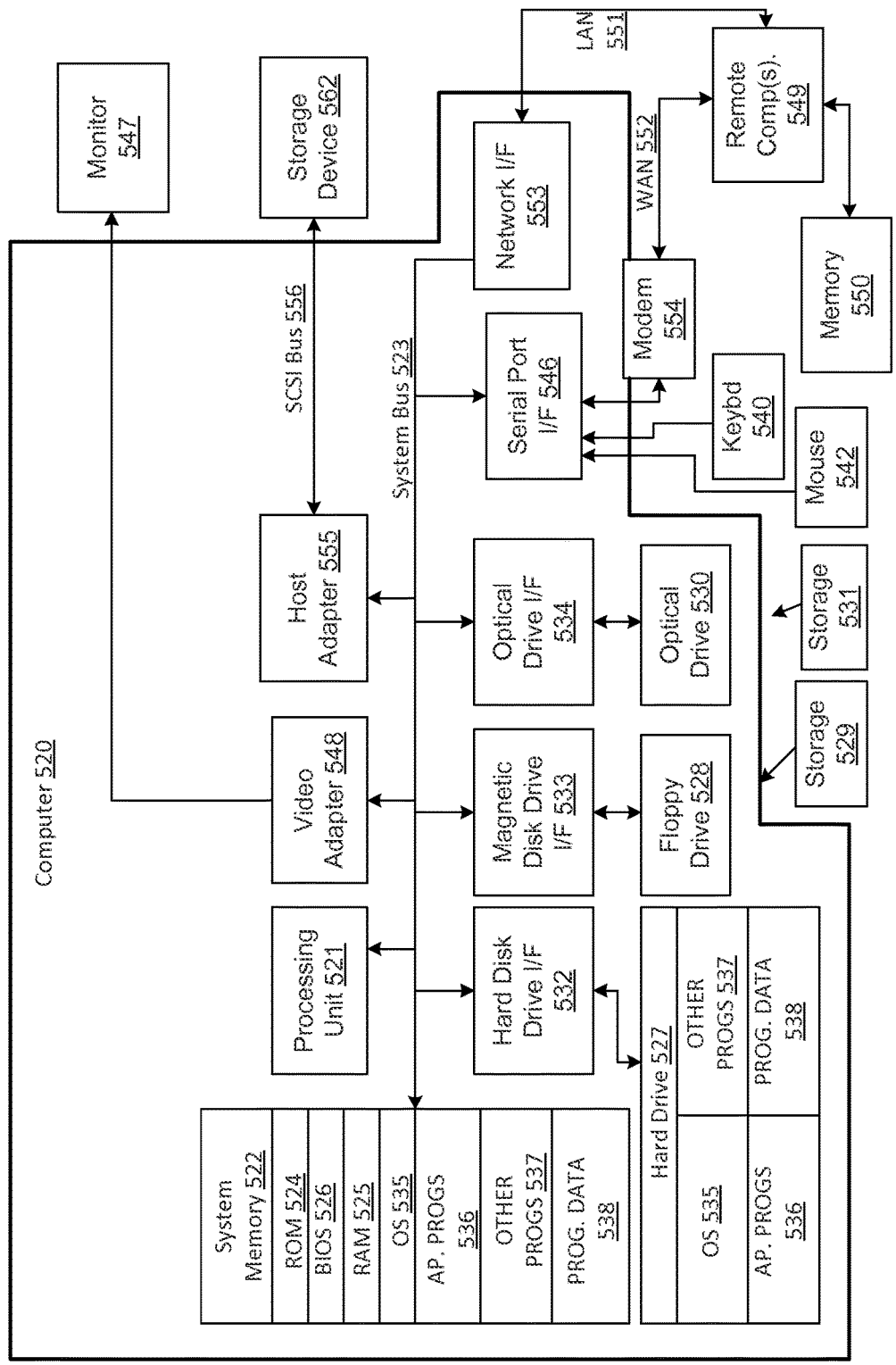
FIG. 6 is an exemplary block diagram representing a general purpose computer system in which aspects of the methods and systems disclosed herein may be incorporated.

FIG. 6 and the following discussion are intended to provide a brief general description of a suitable computing environment in which the methods and systems disclosed herein and/or portions thereof may be implemented. For example, a cooling tower system simulation model may be stored on and/or executed by one or more devices that include some or all of the aspects described in regard to FIG. 6. Some or all of the devices described in FIG. 6 that may be used to perform functions of the claimed embodiments may be configured in a computing device that is remote from a physical location of a cooling tower system or located at the physical location. Some or all of the devices described in FIG. 6 may be included in any device, combination of devices, or any system that performs any aspect of a disclosed embodiment.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Such devices may include, but are not limited to, compact disks, digital versatile discs, hard drives, and memory of any type. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including hand-held devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 6 is a block diagram representing a general purpose computer system in which aspects of the methods and systems disclosed herein and/or portions thereof may be incorporated. As shown, the exemplary general purpose computing system includes computer 520 or the like, including processing unit 521, system memory 522, and system bus 523 that couples various system components including the system memory to processing unit 521. System bus 523 may be any of several types of bus structures including a memory bus or memory controller, a peripheral bus, and a local bus using any of a variety of bus architectures. The system memory may include read-only memory (ROM) 524 and random access memory (RAM) 525. Basic input/output system 526 (BIOS), which may contain the basic routines that help to transfer information between elements within computer 520, such as during start-up, may be stored in ROM 524.

Computer 520 may further include hard disk drive 527 for reading from and writing to a hard disk (not shown), magnetic disk drive 528 for reading from or writing to removable magnetic disk 529, and/or optical disk drive 530 for reading from or writing to removable optical disk 531 such as a CD-ROM or other optical media. Hard disk drive 527, magnetic disk drive 528, and optical disk drive 530 may be connected to system bus 523 by hard disk drive interface 532, magnetic disk drive interface 533, and optical drive interface 534, respectively. The drives and their associated computer-readable media provide non-volatile storage of computer-readable instructions, data structures, program modules and other data for computer 520.

Although the exemplary environment described herein employs a hard disk, removable magnetic disk 529, and removable optical disk 531, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 527, magnetic disk 529, optical disk 531, ROM 524, and/or RAM 525, including an operating system 535, one or more application programs 536, other program modules 537 and program data 538. A user may enter commands and information into the computer 520 through input devices such as a keyboard 540 and pointing device 542. Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device may also be connected to the system bus 523 via an interface, such as a video adapter 548. In addition to the monitor 547, a computer may include other peripheral output devices (not shown), such as speakers and printers. The exemplary system of FIG. 6 may also include host adapter 555, Small Computer System Interface (SCSI) bus 556, and external storage device 562 that may be connected to the SCSI bus 556.

The computer 520 may operate in a networked environment using logical and/or physical connections to one or more remote computers or devices. Remote computer 549 may be a personal computer, a server, a router, a network PC, a peer device or other common network node, and may include many or all of the elements described above relative to the computer 520, although only a memory storage device 550 has been illustrated in FIG. 6. The logical connections depicted in FIG. 6 may include local area network (LAN) 551 and wide area network (WAN) 552. Such networking environments are commonplace in offices, enterprise-wide computer networks, intranets, and the Internet.

When used in a LAN networking environment, computer 520 may be connected to LAN 551 through network interface or adapter 553. When used in a WAN networking environment, computer 520 may include modem 554 or other means for establishing communications over wide area network 552, such as the Internet. Modem 554, which may be internal or external, may be connected to system bus 523 via serial port interface 546. In a networked environment, program modules depicted relative to computer 520, or portions thereof, may be stored in a remote memory storage device. It will be appreciated that the network connections shown are exemplary and other means of establishing a communications link between computers may be used.

Computer 520 may include a variety of computer-readable storage media. Computer-readable storage media can be any available tangible media that can be accessed by computer 520 and includes both volatile and nonvolatile media, removable and non-removable media. By way of example, and not limitation, computer-readable media may comprise computer storage media and communication media. Computer storage media include volatile and non-volatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible and non-transitory medium that can be used to store the desired information and which can be accessed by computer 520. Combinations of any of the above should also be included within the scope of computer-readable media that may be used to store source code for implementing the methods and systems described herein. Any combination of the features or elements disclosed herein may be used in one or more embodiments.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling tower monitoring system comprising:
   a cooling tower system; and
   a computing device that is communicatively coupled to the cooling tower system, the computing system comprising:
      a memory comprising computer instructions; and
      a processor coupled to the memory, wherein, when executing the computer instructions, the processor effectuates operations comprising:
         receiving at least one measurement of a composition of a fluid used in the cooling tower system, the at least one measurement from a cooling tower sensor of the cooling tower system;
         generating a predicted output of a cooling tower system based on a model of the cooling tower system;
         generating an estimated output using an extended Kalman filter with the at least one measurement and the predicted output as inputs, wherein the estimated output represents a characteristic of the fluid used in the cooling tower system;
         determining a bias in the at least one measurement from the cooling tower sensor based on the estimated output and the at least one measurement;
         adjusting the at least one measurement from the cooling tower sensor to correct the bias; and
         adjusting the composition of the fluid used in the cooling tower system based on the adjusted at least one measurement.

2. The cooling tower monitoring system of claim 1, wherein the predicted output of the cooling tower system is associated with an unmeasured characteristic of the cooling tower system.

3. The cooling tower monitoring system of claim 2, wherein the operations further comprise adjusting a parameter of the cooling tower system to cause the estimated output to substantially match a setpoint.

4. The cooling tower monitoring system of claim 1, wherein the operations further comprise adjusting a parameter of the cooling tower system to cause a controlled output to substantially match a setpoint.

5. The cooling tower monitoring system of claim 1, wherein generating the predicted output comprises generating the predicted output based on historical measurement data received from a second cooling tower sensor.

6. The cooling tower monitoring system of claim 1, wherein the estimated output is associated with an unmeasured characteristic of the cooling tower system; and wherein the operations further comprise adjusting operation of the cooling tower system using the estimated output and a real-time optimizer.

7. A method of monitoring a cooling tower system, comprising:
receiving, at a computing device, at least one measurement of a composition of a fluid used in the cooling tower system, the at least one measurement from a cooling tower sensor of a cooling tower system that is communicatively coupled to the computing device;
generating, at the computing device, a predicted output of the cooling tower system based on a model of the cooling tower system;
generating, at the computing device, an estimated output using an extended Kalman filter with the at least one measurement and the predicted output as inputs, wherein the estimated output represents a characteristic of the fluid used in the cooling tower system;
determining a bias in the at least one measurement from the cooling tower sensor based on the estimated output;
adjusting the at least one measurement to correct for the determined bias; and
adjusting the composition of the fluid used in the cooling tower system based on the adjusted at least one measurement.

8. The method of claim 7, wherein the predicted output of the cooling tower system is associated with an unmeasured characteristic of the cooling tower system.

9. The method of claim 8, further comprising adjusting a parameter of the cooling tower system to cause the estimated output to substantially match a setpoint.

10. The method of claim 7, further comprising adjusting a parameter of the cooling tower system to cause a controlled output to substantially match a setpoint.

11. The method of claim 7, wherein generating the predicted output comprises generating the predicted output based on historical measurement data received from a second cooling tower sensor.

12. The method of claim 7, wherein the estimated output is associated with an unmeasured characteristic of the cooling tower system; and wherein the method further comprises adjusting operation of the cooling tower system using the estimated output and a real-time optimizer.

13. A non-transitory computer-readable storage medium comprising executable instructions that when executed by a processor of a computing device that is communicatively coupled to a cooling tower system cause the processor to effectuate operations comprising:
receiving at least one measurement of a composition of a fluid used in the cooling tower system, the at least one measurement from a cooling tower sensor of the cooling tower system;
generating a predicted output of the cooling tower system based on a model of the cooling tower system;
generating an estimated output using an extended Kalman filter with the at least one measurement and the predicted output as inputs, wherein the estimated output represents a characteristic of the fluid used in the cooling tower system;
determining a bias in the at least one measurement from the cooling tower sensor based on the estimated output;
adjusting the at least one measurement to correct the determined bias; and
adjusting the composition of the fluid used in the cooling tower system based on the adjusted at least one measurement.

14. The non-transitory computer-readable storage medium of claim 13, wherein the predicted output of the cooling tower system is associated with an unmeasured characteristic of the cooling tower system.

15. The non-transitory computer-readable storage medium of claim 14, wherein the operations further comprise adjusting a parameter of the cooling tower system to cause the estimated output to substantially match a setpoint.

16. The non-transitory computer-readable storage medium of claim 13, wherein the operations further comprise adjusting a parameter of the cooling tower system to cause a controlled output to substantially match a setpoint.

17. The non-transitory computer-readable storage medium of claim 13, wherein the estimated output is associated with an unmeasured characteristic of the cooling tower system; and
wherein the operations further comprise adjusting operation of the cooling tower system using the estimated output and a real-time optimizer.

* * * * *